US008894918B2

(12) United States Patent
DiCarlo et al.

(10) Patent No.: US 8,894,918 B2
(45) Date of Patent: Nov. 25, 2014

(54) METHODS FOR PRODUCING HIGH-PERFORMANCE SILICON CARBIDE FIBERS, ARCHITECTURAL PREFORMS, AND HIGH-TEMPERATURE COMPOSITE STRUCTURES

(75) Inventors: James A. DiCarlo, N. Olmsted, OH (US); Hee-Mann Yun, N. Olmstead, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 149 days.

(21) Appl. No.: 12/709,086

(22) Filed: Feb. 19, 2010

(65) Prior Publication Data
US 2010/0289192 A1 Nov. 18, 2010

Related U.S. Application Data

(63) Continuation of application No. 10/777,630, filed on Feb. 13, 2004, now Pat. No. 7,687,016.

(51) Int. Cl.
| | |
|---|---|
| *C04B 35/565* | (2006.01) |
| *C04B 35/571* | (2006.01) |
| *C04B 35/80* | (2006.01) |
| *C04B 35/628* | (2006.01) |
| *C04B 35/589* | (2006.01) |
| *C04B 35/584* | (2006.01) |

(52) U.S. Cl.
CPC ............ *C04B 35/803* (2013.01); *C04B 35/571* (2013.01); *C04B 2235/616* (2013.01); *C04B 35/62873* (2013.01); *C04B 35/565* (2013.01); *C04B 35/589* (2013.01); *C04B 35/62884* (2013.01); *C04B 35/62868* (2013.01); *C04B 35/584* (2013.01); *C04B 2235/5244* (2013.01); *C04B 2235/614* (2013.01)
USPC ......................................... 264/640; 264/682

(58) Field of Classification Search
CPC .................. C04B 35/565; C04B 35/80; C04B 2235/5244
USPC ................ 264/625, 624, 29.1, 682, 640, 642; 428/698; 501/95.1
See application file for complete search history.

(56) References Cited

U.S. PATENT DOCUMENTS

| | | | | |
|---|---|---|---|---|
| 5,403,153 | A | * | 4/1995 | Goetze ...................... 416/229 A |
| 6,203,904 | B1 | * | 3/2001 | Sacks ............................ 428/368 |

(Continued)

OTHER PUBLICATIONS

M.H. Jaskowiak and J.A. DiCarlo, "Pressure Effects on the Thermal Stability of Silicon Carbide Fibers", Journal of the American Ceramic Society, vol. 72, Issue 2 (Feb. 1989), pp. 192-197.*
M.D. Sacks, "Effect of Composition and Heat Treatment Conditions on the Tensile Strength and Creep Resistance of SiC-based Fibers", Journal of the European Ceramic Society, vol. 19, Issues 13-14 (Oct. 1999), pp. 2305-2315.*

(Continued)

*Primary Examiner* — Erin Snelting
(74) *Attorney, Agent, or Firm* — Robert H. Earp, III

(57) ABSTRACT

Methods are disclosed for producing architectural preforms and high-temperature composite structures containing high-strength ceramic fibers with reduced preforming stresses within each fiber, with an in-situ grown coating on each fiber surface, with reduced boron within the bulk of each fiber, and with improved tensile creep and rupture resistance properties tier each fiber. The methods include the steps of preparing an original sample of a preform formed from a pre-selected high-strength silicon carbide ceramic fiber type, placing the original sample in a processing furnace under a pre-selected preforming stress state and thermally treating the sample in the processing furnace at a pre-selected processing temperature and hold time in a processing gas having a pre-selected composition, pressure, and flow rate. For the high-temperature composite structures, the method includes additional steps of depositing a thin interphase coating on the surface of each fiber and forming a ceramic or carbon-based matrix within the sample.

19 Claims, 11 Drawing Sheets

(56) References Cited

U.S. PATENT DOCUMENTS 7,687,016 B1 * 3/2010 DiCarlo et al. ............... 264/624
2002/0076541 A1 * 6/2002 Jarmon et al. ............ 428/312.6

OTHER PUBLICATIONS

H.M. Yun et al., "Tensile Behavior of SiC/SiC Composites Reinforced by Treated Sylramic SiC Fibers," 25th Annual Conference on Advanced Ceramics and Composites, Jan. 25, 2001.*

* cited by examiner

| TRADE-NAMES | Hi-Nicalon | Hi-Nicalon S | Tyranno SA | Sylramic | Sylramic-iBN (or Sylramic-O) |
|---|---|---|---|---|---|
| Manufacturer | Nippon Carbon | Nippon Carbon | UBE Industries | Dow Corning* | Dow Corning* + Invention |
| Max. Process Temp. | ~1300°C | ~1600°C | >1700°C | >1700 | >1700°C |
| Second Phases | C/Si=1.4 + trace O | C/Si=1.05 + trace O | C/Si=1.08 + trace $Al_2O_3$ | C/Si=1.0 + trace B, Ti | Reduced B, trace Ti |
| Surface Chemistry | C-rich | C-rich | SiC | B + Ti + SiC | BN (or O) |
| Avg. Grain Size, nm | 5 | <100 | >150 | ~100 | >100 |
| Thermal Conductivity at 25°C, W/m°C | 6 | 18 | 65 | 46 | 46 |
| Strength (Fabric), MPa | 2100 | 1600 | 1300 | 2200 | 2100 |
| Creep Strain, 1400°C, 250 MPa, 50 hr. air | >1.0% | 0.2% | >0.5% | >0.5% | 0.1% |
| Max. Temp. For Rupture At 350 MPa, 1000 hr. air | 1200°C | 1150°C | 1150°C | 1150°C | 1300°C |

\* Sylramic fiber now being produced by COI Ceramics

Fig. 1

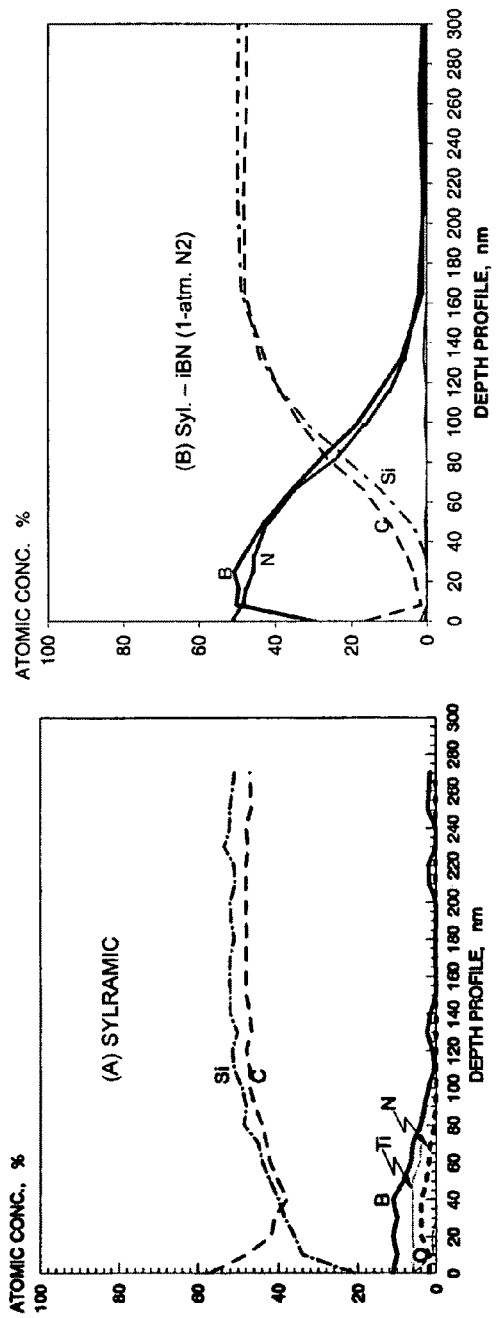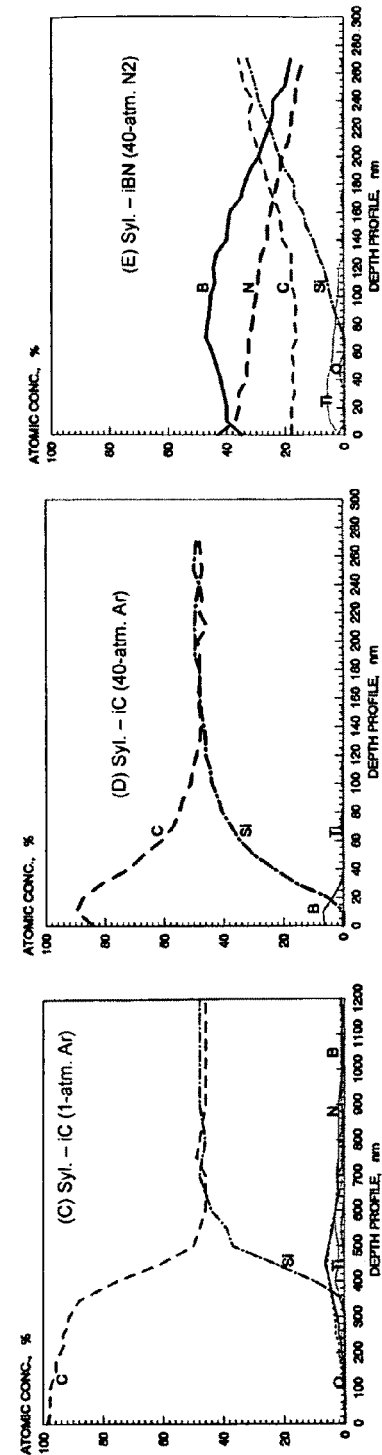
Fig. 2a
Fig. 2b
Fig. 2c
Fig. 2d
Fig. 2e

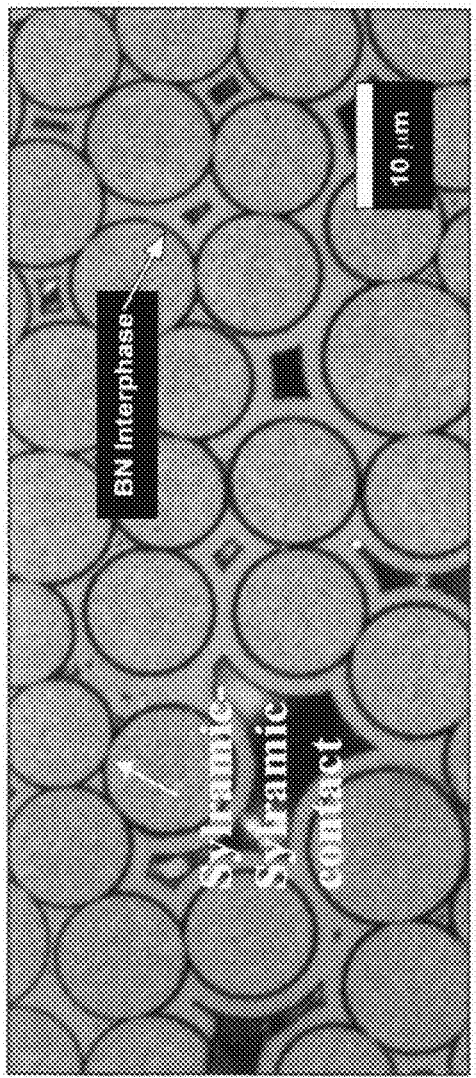
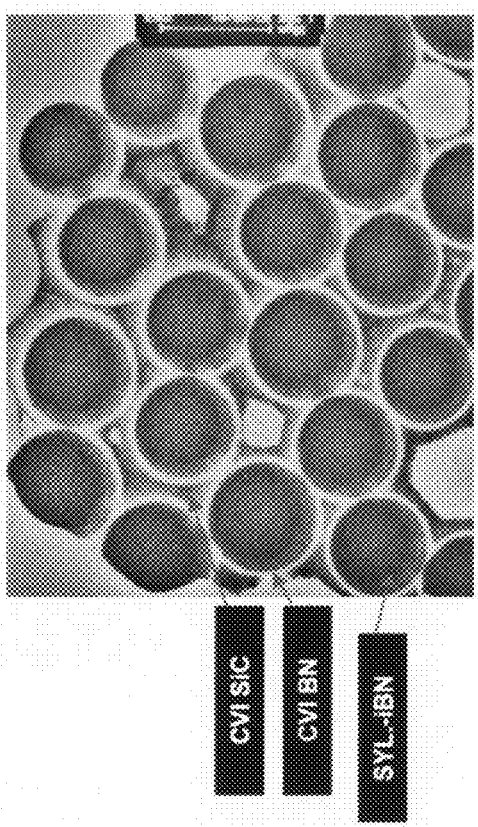
Fig. 10(a)
Fig. 10(b)

METHODS FOR PRODUCING HIGH-PERFORMANCE SILICON CARBIDE FIBERS, ARCHITECTURAL PREFORMS, AND HIGH-TEMPERATURE COMPOSITE STRUCTURES

CROSS-REFERENCE RELATED TO APPLICATION

This application is a Continuation of, and claims priority to U.S. Non-Provisional patent application Ser. No. 10/777,630, which was filed Feb. 13, 2004, and claims the benefit of U.S. Pat. No. 7,687,016, which issued on Mar. 13, 2004. The subject matter of this earlier-filed application is hereby incorporated by reference in its entirety

ORIGIN OF THE INVENTION

The invention described herein was made by an employee of the United States Government and may be manufactured and used by or for the Government for Government purposes without payment of any royalties thereon or therefore.

BACKGROUND OF THE INVENTION

1. Field of Invention

The present invention relates to methods that have been developed for producing high-performance silicon carbide (SiC) fibers, SiC multi-fiber tows, SiC fiber architectural preforms, and high-temperature SiC fiber-reinforced composite structures with state-of-the-art thermostructural and environmental performance. In particular, the present invention describes thermal-chemical treatment processes for fiber architectural preforms formed from high-strength SYLRAMIC SiC fibers that were commercially produced at high temperature (>1600° C.) using boron-containing sintering aids. The treated SiC fibers have been shown to display state-of-the-art properties in terms of tensile strength, creep resistance, and rupture resistance. The treated preforms have been shown to display enhanced shape capability and to yield SiC fiber-reinforced ceramic matrix composite structures with state-of-the-art properties in terms of intrinsic temperature capability, ultimate tensile strength, creep strength, rupture strength, and strength retention after exposure to elevated and high-temperature oxidizing conditions.

2. Description of Related Art

The realization of improved gas turbine engines for aero and space propulsion as well as for land-based power generation will depend strongly on advancements made in the upper use temperature and life capability of the structural materials used for such engine hot-section components as combustor liners, inlet turbine vanes, and turbine blades. Components with improved thermal capability and longer life between maintenance cycles will allow improved engine performance by reducing cooling requirements and life-cycle costs. This in turn is expected to reduce fuel consumption, $NO_x$ and $CO_2$ emissions, ticket cost, and flight times for commercial aircraft; to allow improved thrust-to-weight and performance for space and military engines; and to reduce emissions and power costs for the electrical power industry.

Today the major thrust in the United States, Japan, and Europe for achieving these benefits is by the development of fiber-reinforced ceramic matrix composites (CMC) in general and of silicon-carbide fiber-reinforced silicon-carbide matrix (SiC/SiC) composites in particular. These materials are not only lighter in weight and capable of higher use temperatures than state-of-the-art metallic alloys, but also capable of providing significantly better damage tolerance than un-reinforced monolithic ceramics. However, for successful application in advanced gas turbine engines, the ceramic composites should be producible in multiple shapes and display and maintain the highest tensile strength possible at the service temperatures, environments, and lifetimes required for the hot-section components. Also, because of possibility of large thermal gradients in these components, the composites should provide the uppermost in thermal conductivity and creep resistance in order to minimize the development of thermal stresses and creep-induced dimensional changes within the materials during their service life.

Material science theory and ceramic composite experience have shown that chemical and physical conditions within the bulk and on the surface of the reinforcing ceramic fiber are the primary factors controlling such key CMC property requirements as high shape-ability, high as-produced tensile strength, and high strength retention during composite service under aggressive environments at high temperatures. These fiber-related factors have also been demonstrated to play an important role in other key CMC property requirements such as high thermal conductivity and high creep resistance. Thus the major technical challenge for implementation of ceramic composites in engine hot-section components is to develop ceramic fibers that can provide the uppermost in these properties, not only after fiber production, but also after CMC component fabrication and during engine service.

Prior art fiber materials for high-performance SiC/SiC composites include various commercially available polycrystalline SiC-based fiber types produced in continuous length by polymer spinning, curing, pyrolysis, and sintering. For reinforcement of SiC/SiC components, typical property requirements for the as-produced individual SiC fibers are high as-produced tensile strength (>2.5 GPa) and small diameter (<15 μm). The small diameter is required so that conventional textile forming processes could be used to produce net-shape fiber architectural preforms needed for CMC component shape and structural requirements. First generation SiC-based fiber types that have met these requirements include the non-stoichiometric (C/Si>1) NICALON fiber from Nippon Carbon and the TYRANNO Lox M fiber from UBE Industries. Besides being carbon rich, these fibers contain small (<5 nm) grains and high oxygen content which contribute to grain growth, excessive grain-boundary sliding, and chemical decomposition, thereby limiting fiber thermal conductivity, creep-rupture resistance, and capability for strength retention to composite fabrication temperatures less than 1300° C. and to composite long-term service temperatures less than 1200° C.

Production methods for second generation SiC fiber types, such as the HI-NICALON fiber from Nippon Carbon, have focused primarily on reducing oxygen content, but the remaining small grains and large carbon content still limit composite long-term service temperatures to less than 1300° C., as well as giving rise to non-optimized fiber thermal conductivity. Production methods for the more recent SiC fiber types have added high-temperature sintering processes that yield larger grains and purer, more stoichiometric (C/Si~1) compositions. These include the SYLRAMIC fiber from Dow Corning, the HI-NICALON Type S fiber from Nippon Carbon, and the TYRANNO SA fiber from UBE Industries. The reduced oxygen and carbon content allow these near-stoichiometric fiber types to maintain tensile strength at fiber production temperatures above 1600° C., which are much higher in comparison to those used for the earlier generation types. The higher production temperatures in turn allow the grains to grow and provide higher fiber creep resistance and thermal conductivity, provided grain boundaries with high purity can be achieved.

Some important microstructural and physical properties of the most thermally capable commercial SiC fiber types in their as-produced condition are listed in the table in FIG. 1. The fibers are generally made available in two architectural forms: (1) one-dimensional continuous lengths of multi-fibers or "tows' that typically contain 500 to 800 fibers and can be easily handled and formed into component-specific three-dimensional architectural preforms by end-users, and (2) two-dimensional planar cloth or fabric in which the tows are typically woven in two orthogonal directions (0/90) for laminate construction of simple-shaped components. For comparison purposes, FIG. 1 also includes the developmental SYLRAMIC-iBN and SYLRAMIC-iC fibers, which are examples of high-performance SiC fiber types that have been produced from the SYLRAMIC fiber using the methods of this invention.

For the purpose of achieving high performance high-temperature SiC/SiC components, ceramic composite experience has also shown that a variety of issues exist which relate to retaining the as-produced properties of the reinforcing SiC fibers during component fabrication and service. Many of these issues arise in the fabrication stage during the various steps of (1) shaping the continuous length fibers into architectural arrays or preforms that yield near net-shape component structures, (2) coating the fibers within the architectural preforms with thin fiber coatings or interphase materials that are required for matrix crack deflection, and (3) infiltrating the coated-fiber architectural preforms with SiC-based matrix material, which is often performed at temperatures of 1400° C. and above.

For example, during the architecture formation or "preforming" step, potential fiber strength degrading mechanisms include fiber bending, which can introduce detrimental residual stresses in the fibers, and fiber-fiber abrasion which may weaken the fibers by providing new surface flaws. In combination, these mechanisms could cause premature fiber fracture during the preforming step or eventually during component structural service.

Also, during the fiber coating or interphase formation step, which is typically performed by the chemical vapor infiltration (CVI) of boron nitride (BN) or carbon (C) yielding precursor gases, potential fiber strength degrading mechanisms include the risk that chemically aggressive gases such as halogens, hydrogen, and oxygen may reach the SiC fiber surface before the protective and non-reactive BN and C interphase materials are formed. The halogens and hydrogen have been demonstrated to cause fiber weakening by surface flaw etching; whereas oxygen allows the growth of silica on the fiber surfaces, which in turn causes strong mechanical bonds to be formed between contacting fibers in the fiber architectures. The detrimental consequence of fiber-fiber bonding is that if one fiber should fracture prematurely, all others to which it is bonded will prematurely fracture, causing composite fracture or rupture at stresses much lower than those that would be needed if the fibers were able to act independently. This oxidation issue is also serious during SiC/SiC service where the possibility exists that cracks may form in the SiC matrix, thereby allowing oxygen from the service environment to reach the reinforcing fibers. Because of the high reactivity of carbon with oxygen above ~500° C. and subsequent volatility of the bi-products, cracking of the matrix can be especially serious for those SiC fiber types with carbon-rich surfaces or for fibers and interphase materials based on carbon.

Finally, during the matrix formation step, current SiC/SiC fabrication trends are progressing toward SiC-based matrices that are processed at 1400° C. and above in order to improve matrix and composite creep-rupture resistance and thermal conductivity. In these cases, the matrix formation times and temperatures are high enough to cause strength degradation in the non-stoichiometric SiC fibers that are produced at temperatures below 1400° C. Strength degradation can also occur in a near-stoichiometric type if its maximum production temperature (see FIG. 1) is below that for matrix processing.

Based on achieving SiC/SiC components that display the highest temperature capability and highest thermostructural properties after fabrication and during service, current state-of-the-art SiC/SiC fabrication routes are employing the following constituent materials: (1) commercial SiC fiber types with high as-produced tensile strength, carbon-free surfaces, and production temperatures above 1600° C.; (2) BN-based interphases, which are significantly more oxidation resistant than carbon-based materials; and (3) SiC-based matrices with high creep-rupture resistance, high thermal conductivity, and formation temperatures above 1400° C. As indicated in FIG. 1, the commercial SiC fiber type that meets most of these fiber requirements in its as-produced condition is the SYLRAMIC fiber that was originally produced by Dow Corning and is currently being produced by COI Ceramics. This fiber type is fabricated by the polymer route, in which precursor fibers based on polycarbosilane are spun into multi-fiber tows and then cured, pyrolyzed, and sintered at high temperature (>1700° C.) using boron-containing sintering aids (U.S. Pat. Nos. 5,071,600, 5,162,269, 5,268,336, 5,279,780, and Ceram. Eng. Sci. Proc., Vol. 18 [3], 1997, pp. 147-157). The sintering process results in very strong fibers (>3 GPa) that are dense, oxygen-free, near stoichiometric, and contain ~1 and ~3 weight % of boron and $TiB_2$, respectively.

Despite displaying enhanced properties, performance issues related to certain factors existing in the as-produced bulk and on the fiber surface have been found to limit the thermostructural performance of the SYLRAMIC fiber, both as individual fibers and as textile-formed architectural preforms for SiC/SiC composites. For example, excess boron in the bulk is typically located on the fiber grain boundaries, thereby inhibiting the fiber from displaying the optimum in creep resistance, rupture resistance, and thermal conductivity associated with its grain size. Also in the presence of oxygen-containing environments during composite fabrication or service, boron on the fiber surface can promote detrimental silica ($SiO_2$) growth that bonds neighboring fibers together and degrades composite strength.

In addition, like all near-stoichiometric SiC fibers, the high elastic modulus of the SYLRAMIC fiber (~400 GPa), gives rise to elastic tensile stresses on the fiber surfaces when the fibers are bent and shaped to form simple 2D fabric or more complex 3D component architectural preforms. These stresses limit fiber formability and add to any tensile stresses that are applied to the final composite component, thereby limiting component capability for resisting external stresses during service. Finally surface roughness exists on all SiC fibers, which can be correlated in magnitude to the fiber average grain size (see FIG. 1). Thus the near-stoichiometric SiC fibers, like the SYLRAMIC fiber, display the greatest surface roughness, which not only can cause adverse fiber-fiber abrasion during tow handling and shaping into complex architectures, but also can lead to adverse mechanical interlocking between contacting fibers within tows in the final composite microstructure. This interlocking effect is similar to the oxide-bonding effect where the failure of one weak fiber can cause the premature failure of its strong neighboring fibers, resulting in poor composite ultimate strength and toughness.

SUMMARY OF THE INVENTION

According to one embodiment of the invention, a method for reducing fiber stress within architectural preforms formed from high-strength polycrystalline ceramic fibers is disclosed. The method includes the steps of preparing an original sample composed of an architectural preform formed from a high-strength polycrystalline ceramic fiber type, where the architectural preform is at least one of a finite section of a continuous-length multi-fiber tow, a two-dimensional textile-formed fabric, and a three-dimensional textile-formed complex-shaped structure, placing the original sample in a processing furnace under a preforming stress state and thermally treating the original sample in the processing furnace at a processing temperature and a hold time in a processing gas having a composition, a pressure, and a flow rate. The composition of the ceramic fiber type, the preforming stress state, the processing temperature and the hold time, and the composition, the pressure, and the flow rate are pre-selected to allow minimal loss in an average tensile strength of the fibers, to allow preforming stresses within the ceramic fibers created by the preparation and placement steps on the original sample to be reduced by creep-relaxation, and to allow the thermally treated sample to achieve a more technically advantageous preform shape.

According to another embodiment, the present invention is directed to a method for producing high-strength ceramic fibers and ceramic fiber architectural preforms with an in-situ grown coating on each fiber surface with a composition different than that of the bulk fiber. The method includes the steps of preparing an original sample composed of an architectural preform formed from an as-produced high strength ceramic fiber type, where the architectural preform is at least one of a finite section of a continuous-length multi-fiber tow, a two-dimensional textile-formed fabric, and a three-dimensional textile-formed complex-shaped perform, placing the original sample in a processing furnace and thermally treating the original sample in the processing furnace at a processing temperature and a hold time in a processing gas having a composition, a pressure, and a flow rate. The fiber composition, the processing temperature and the hold time, and the gas composition, the pressure, and the flow rate are preselected to allow atomic decomposition from surfaces of each fiber, with minimal loss in an average tensile strength of the fibers within the thermally treated sample. For ceramic fibers with a SiC composition, this method will allow the decomposition of silicon from the fiber surface, thereby resulting in an in-situ grown carbon layer on each treated fiber.

According to another embodiment, a method for producing high-strength ceramic fibers and ceramic fiber architectural preforms with reduced boron in the bulk of each fiber is disclosed. The method includes the steps of preparing an original sample composed of an architectural preform formed from a boron-containing high strength ceramic fiber type, where the architectural preform is at least one of a finite section of a continuous-length multi-fiber tow, a two-dimensional textile-formed fabric, and a three-dimensional textile-formed complex-shaped perform, placing the original sample in a processing furnace and thermally treating the original sample in the processing furnace at a processing temperature and a hold time in a processing gas with a composition, a pressure, and a flow rate. The fiber composition, the processing temperature and the hold time, and the gas composition, the pressure, and the flow rate are preselected to allow the removal of boron from the bulk of each fiber, with minimal loss in an average tensile strength of the fibers within the treated sample. For ceramic fibers with a boron-containing SiC composition, this method will allow the treated fibers to display enhanced creep resistance and rupture resistance.

According to another embodiment, the present invention is directed to a method for producing high-strength ceramic fibers and ceramic fiber architectural preforms with boron-containing surface coatings on each fiber. The method includes the steps of preparing an original sample composed of an architectural preform formed from a boron-containing high strength ceramic fiber type, where the architectural preform is at least one of a finite section of a continuous-length multi-fiber tow, a two-dimensional textile-formed fabric, and a three-dimensional textile-formed complex-shaped perform, placing the original sample in a processing furnace and thermally treating the original sample in the processing furnace at a processing temperature and a hold time in a processing gas having a composition, a pressure, and a flow rate. The processing temperature and the hold time, and the pressure, and the flow rate are preselected to allow the simultaneous removal of boron from each fiber and the in-situ growth of a coating with a boron-containing composition on each fiber surface, with minimal loss in an average tensile strength of the fibers within the thermally treated sample. For ceramic fibers with a composition based on silicon carbide (SiC) with boron additives and treated in a gas with a high-purity nitrogen composition, this method will allow the formation of an in-situ grown layer on each treated fiber with a composition based on boron nitride.

According to another embodiment, the present invention is directed to a method for producing a SiC fiber-reinforced composite material structure with improved properties. The method includes the steps of preparing an original sample composed of an architectural preform formed from an as-produced high strength ceramic fiber type based on silicon carbide (SiC) with boron additives, where the architectural preform is at least one of a finite section of a continuous-length multi-fiber tow, a two-dimensional textile-formed fabric, and a three-dimensional textile-formed complex-shaped perform, placing the original sample in a processing furnace, thermally treating the original sample in the processing furnace at a pre-selected processing temperature and a hold time in a processing gas having a pre-selected composition, a pressure, and a flow rate, depositing a thin interphase coating on the treated fibers within the sample by chemical vapor infiltration and forming a ceramic matrix within the coated sample. For sample treatment in a gas with a high-purity nitrogen composition, this method will allow the production of a SiC fiber-reinforced ceramic matrix composite structure with improved properties including ultimate tensile strength, intrinsic strength retention at high temperatures, rupture strength after matrix pre-cracking, and long-term oxidation resistance.

BRIEF DESCRIPTION OF THE DRAWINGS

To be easily understood and readily practiced, the present invention will now be described, for purposes of illustration and not limitation, in conjunction with the following figures.

FIG. 1 provides a table of some important physical, chemical, and mechanical properties as measured for individual as-produced SiC-based fiber types of current technical interest as reinforcement for high-temperature composites. Also included are the properties of the SYLRAMIC-iBN and SYLRAMIC-iC fiber types (shaded column) that were produced from the commercial SYLRAMIC fiber by the high-pressure embodiment of this invention.

FIG. 2 provides AES depth profiles that show elemental compositions within the surface layers of (a) the as-produced SYLRAMIC fiber, (b) the SYLRAMIC-iBN fiber produced in nitrogen at one atmosphere, (c) the SYLRAMIC-iC fiber produced in argon at one atmosphere, (d) the SYLRAMIC-iC fiber produced in argon at 40 atmospheres, and (e) the SYLRAMIC-iBN fiber produced in nitrogen at 40 atmospheres.

FIG. 7 illustrates that one embodiment of the present invention, when applied to a cylindrical fiber architecture, can allow formation of the SYLRAMIC-iBN fiber while simultaneously creep-forming the architecture into a component shape with no residual elastic stresses remaining in the architecture.

FIG. 10 provides typical SEM micrographs of (a) SYLRAMIC fibers and (b) SYLRAMIC-iBN fibers within tows that have been textile-woven and used to reinforce SiC/BN/SiC composites.

DETAILED DESCRIPTION OF PREFERRED EMBODIMENTS

Figure 3:
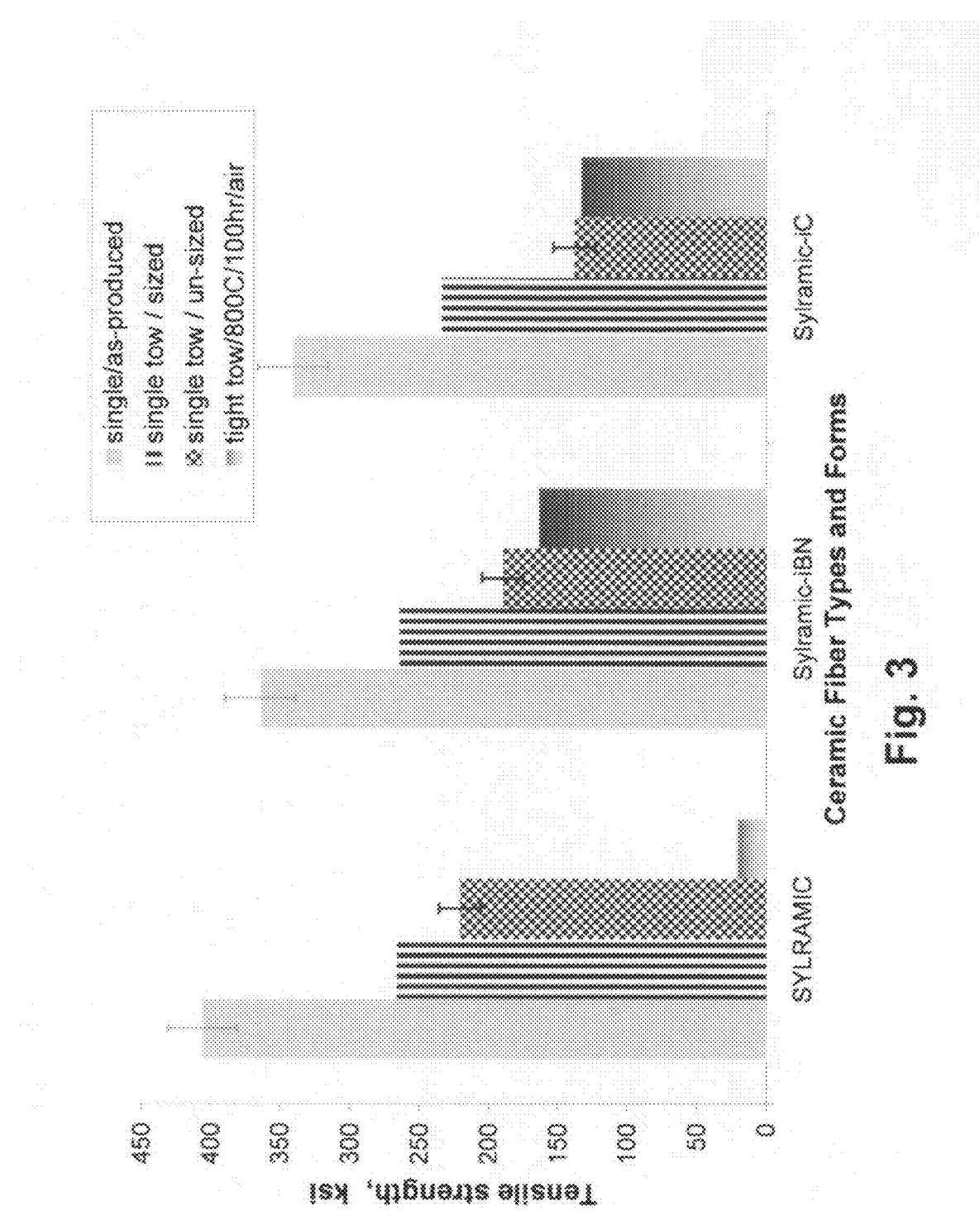
FIG. 3 shows the average room-temperature strength of single as-produced SYLRAMIC and high-pressure formed SYLRAMIC-iBN and SYLRAMIC-iC fibers. Also shown is the average room-temperature strength of single tows of these fibers after the following treatments: as-produced and sized, as-produced and un-sized, and exposed for 10 hours in air at 800° C. while being tightly held in a woven fabric.

With the goal of achieving advanced engine components that display the highest temperature capability, highest structural properties, and longest lifetime under oxidizing conditions, current efforts in the U.S. and elsewhere are focusing on the development of SiC/SiC composite materials reinforced by SiC-based fiber types with high as-produced tensile strength, carbon-free surfaces, and fiber production temperatures above 1600° C. As indicated in FIG. 1, the commercial SiC fiber type that best meets these fiber requirements is the boron-containing SYLRAMIC fiber. Thus the preferred embodiments for this invention were developed based on further improving the properties of the as-produced SYLRAMIC fiber and other high-temperature SiC fiber types within a variety of fiber architectural preforms with potential for SiC/SiC component fabrication.

Free boron in the bulk of the SYLRAMIC fiber is typically located on the fiber grain boundaries, thereby inhibiting the fiber from displaying the optimum in creep resistance, rupture resistance, and thermal conductivity associated with its grain size. High purity nitrogen was selected as the primary treatment gas because of the possibility of removing boron from the fiber bulk while simultaneously forming an in-situ grown BN layer on the fiber surface that can provide enhanced oxidation resistance to the fiber and other advantages for SiC/SiC composite performance. However, it was unexpectedly determined that high purity argon treatments could also remove boron without BN formation, but with the controllable growth of an in-situ carbon layer on the fiber surface that could also have advantages for SiC/SiC composite performance. Although fibers with carbon-rich surfaces typically yield SiC/SiC composites with poor oxidation resistance, such fiber types were not excluded from the preferred embodiments because high-performance SiC/SiC components are also envisioned for non-oxidizing applications, such as may exist in advanced nuclear reactor designs.

This invention centers on the development of specially designed thermal-chemical treatments under selected compositions, pressures, and flow rates of nitrogen and argon gas. The treatments were performed above 1600° C. on fiber architectural preforms that were textile-formed from high-strength SiC fiber types that could withstand the treatment conditions with little or no strength loss. The treatment conditions were further optimized to improve the performance of these architectures by minimizing composite component fabrication and service issues, including those associated with preforming stresses in the fiber architectures and with fiber surface roughness, and also those associated with boron-containing production aids in sintered SiC fibers, such as the commercial high-performance SYLRAMIC fiber. To minimize the preforming stress issues, treatments under either gas were found to cause the stresses to be relaxed to near zero value by fiber creep. To minimize fiber surface roughness issues, treatments under argon were found to grow a thin carbon-based layer of controllable thickness on the fiber surface. The carbon appeared as the result of decomposition of SiC surface layers by volitization of silicon. However, for the boron-containing SiC fiber types, such as the SYLRAMIC fiber, the preferred treatments were performed under nitrogen so that free boron in the fiber bulk could diffuse to the fiber surface where it reacted with nitrogen to form a thin abrasion-resistant BN-based layer on the entire fiber surface. This in-situ grown BN surface layer created a more environmentally durable fiber surface, not only because BN is more resistant to oxygen and silicon than carbon, but because the BN layers provided more stable physical barriers between contacting SiC fibers within the final composite microstructures.

It was unexpectedly found that removal of free boron from the SYLRAMIC fiber bulk also occurred during argon treatment, where it probably evaporated from the fiber surface instead of reacting with nitrogen. Boron removal from the bulk under either gas treatment significantly improved fiber creep resistance, rupture resistance, electrical conductivity, and probably fiber thermal conductivity since the grains were slightly larger and the grain boundaries cleaner. As indicated in FIG. 1, SYLRAMIC fiber properties after the nitrogen treatment (SYLRAMIC-iBN) and after the argon treatment (SYLRAMIC-iC) were similar, except for an in-situ grown BN (iBN) layer and an in-situ grown carbon (iC) layer, respectively.

Prior art in terms of using thermal-chemical treatments on boron-containing SiC fibers exists in U.S. Pat. Nos. 6,040,008 and 6,069,102 of Sacks. U.S. Pat. No. 6,040,008 details "a process for producing a boron nitride coating on a boron-doped, silicon carbide fiber by exposing the fiber to an atmosphere consisting primarily of nitrogen gas, and maintaining the fiber at a treatment temperature sufficient to develop a boron nitride coating on the fiber, where the tensile strength of said fiber having the boron nitride coating is approximately equal to the tensile strength of the fiber prior to production of said boron nitride coating". This patent also suggests that after high-temperature nitrogen treatment, the fibers will "show improved creep resistance". In addition, U.S. Pat. No. 6,069,102, provides "a method of forming a high strength, high creep resistance, silicon carbide fiber having no boron nitride coating, by providing a boron-doped, silicon carbide fiber; exposing the fiber to an atmosphere containing nitrogen and exposing the fiber to an atmosphere containing carbon monoxide".

The discoveries and claims of this invention differ in many aspects from the prior art patents of Sacks. For example, this invention is specifically applicable to fiber architectures containing commercially produced, thermally stable, high-strength (>3 GPa) SiC fibers in general and high-performance boron-doped SYLRAMIC fibers in particular. It demonstrates that different thermal treatments can be developed that not only maintain individual fiber strength in complex textile-woven architectures, but also improve fiber surface conditions so that SiC/SiC composite structures can be fabricated with state of the art structural properties. On the other hand, the boron-doped SiC fibers of Sacks were produced, treated, and tested in the laboratory as single fibers with average strengths before and after treatment of less than 3 GPa. Thus the development of key scale-up processes to high-strength architectural preforms and composites using commercial high-strength SiC-based fibers was not demonstrated or claimed in the prior art of Sacks et al.

Also embodiments of the present invention teach that nitrogen and argon pressures greater than one atmosphere are the preferred treatment conditions because they not only significantly improve fiber creep-rupture resistance over one atmosphere treatments, but also enhance gas penetration into tight textile-formed architectural preforms; whereas the prior art patents of Sacks claim nitrogen and argon pressures only up to one atmosphere, again with application only to single fibers. In addition, this invention teaches that high-pressure nitrogen and argon treatments truly enhance both the tensile creep resistance and rupture resistance of single SYLRAMIC fibers and final SiC/SiC composites reinforced by the treated fibers; whereas the Sacks patents teach only enhanced creep resistance for single fibers and only after using one-atmosphere nitrogen treatment at one stage or another. Also Sacks employs a bend stress relaxation test for creep evaluation, the results of which can be erroneous and not applicable to ceramic composite performance under tensile loading.

In addition, the commercial SYLRAMIC SiC-based fibers used in this invention contain about ~3 weight % of $TiB_2$, which can play a role in the degree of enhanced creep resistance compared to the SiC fibers of Sacks, which are free of this compound. Also this invention teaches that impurities in the nitrogen gas must be kept as low as possible in order to form a technically useful in-situ BN microstructure for optimum matrix crack deflection and mechanical compliancy between contacting fibers; whereas the prior art patents of Sacks do not claim anything about impurity content, and a related technical report (Ceram. Eng. Sci. Proc., Vol. 19 [4A], 1998, pp. 73-86), shows a lab-grown BN microstructure with weak shear planes perpendicular to the fiber surface, a non-optimum microstructure for matrix crack deflection. Finally, this invention teaches that for optimum ceramic composite performance, the treated fibers should have three key properties: a BN protective layer, enhanced creep resistance, and enhanced rupture resistance, a combination of very important technical goals that were not claimed in any of the patents of Sacks.

Also, in contrast to any known prior art, embodiments of the present invention teach that when the nitrogen or argon treatments are applied to complex-shaped fiber architectural preforms, advantageous stress relaxation occurs within the fibers, thereby reducing bending-related residual stresses. Also this invention teaches that when the in-situ grown BN layers completely surround every fiber in textile-formed preforms, they can act as physical barriers between contacting SiC fibers, thereby enhancing the strength capability, oxidative durability, and intrinsic thermal stability of a wide variety of SiC-fiber reinforced high-temperature composites. Also embodiments of the present invention teach that in-situ grown carbon layers of controlled thickness can be grown on all SiC fiber types, which may be advantageous for eliminating the costly coating formation step for fiber preforms and for enhancing composite performance for applications under non-oxidizing conditions. Finally this invention teaches that when the nitrogen or argon treatments are applied to tows before or after preform formation, the in-situ BN or carbon layers can act to avoid undesirable mechanical interactions between contacting fibers.

Development of Treatment Conditions

The preferred embodiments of the present invention were developed from experimental studies with three primary objectives. The first objective was to determine the range of practical treatment conditions (treatment time-temperature, gas composition, gas pressure, gas flow rate) that remove free boron from as-produced SYLRAMIC fibers within simple fiber architectural preforms with minimum degradation in fiber tensile strength. The second objective was to vary the treatment conditions within this practical range in order to achieve optimum improvement both in the creep and rupture properties of the treated fibers. The third objective was to determine whether the optimum treatment conditions could be practiced on more complex architectural preforms with the added benefit of simultaneously shaping the preforms with minimum preforming residual stresses. At the onset, it was decided that for large fiber throughput and process cost-effectiveness, the treatment conditions should be determined using "batch" processing in which large volumes of SYLRAMIC fiber in various architectural preforms are held static while being treated in a furnace. Batch processing also provided the additional advantage of treating large complex-shaped component preforms. Thus a Hot Press apparatus (manufactured by IVI Inc.) was employed for treatments under vacuum to one atmosphere gas pressure; whereas a mini-HIP apparatus (manufactured by ABB) was employed for high-pressure treatments up to 200 atmospheres gas pressure. Both facilities contained graphite-heating elements capable of working in pure nitrogen or argon environments up to 2000° C.

Treatment studies on simple architectural preforms were performed primarily with continuous-length SYLRAMIC multi-fiber tows that were wound in multi-layers on a 88 mm diameter high-purity graphite (ATJ grade from Union Carbide) cylinder. Some studies also included individual 150× 230 mm pieces of two-dimensional fabric woven from SYLRAMIC tows that were stacked as multi-plies (typically 8 plies) and then inserted between two dense graphite (AJ grade) plates and held simply by the plate weight. The cylinders and plates were then inserted into the furnace hot zones with typical working volumes of 230×230×300 mm and with good temperature uniformity (within 2% deviation in the range of 1500 to 1900° C.). Temperature for both furnaces was controlled and measured by two shielded Type R thermocouples located at the top and middle of the hot zones, respectively. To avoid potential contamination, the graphite cylinders and plates were pre-baked in the IVI furnace at 1800° C. for 1 hour in a vacuum of 0.00005 mmHg. For graphite bake-out, the IVI chamber was first purged by nitrogen gas of >99.99% purity prior to evacuation. For the preform treatment runs at one atmosphere, the IVI chamber was purged with high purity (>99.99%) argon or nitrogen gas, and throughout the treatment the gas flowed constantly through the chamber at a convenient rate of 1 cubic-foot/hr. For the preform treatment runs at high pressure, the mini-HIP chamber was initially filled with high purity argon or nitrogen gas at a slightly positive pressure (~5 psig), and then the gas inlet valve was closed for the entire treatment (zero gas flow rate).

To determine the range of treatment conditions that remove boron from the SYLRAMIC fiber with minimum strength loss, depth-profile Auger Electron Spectroscopy (AES) analyses were conducted on single fibers removed from as-produced and treated preforms, along with room-temperature measurements of their fast-fracture tensile strength (25 mm gauge length). For convenient batch processing of at least 1 hour, it was determined that boron removal without fiber strength loss could be achieved in argon or nitrogen pressures from one to ~45 atmospheres and for treatment temperatures of 1700° C. and above. However, for nitrogen pressures greater than 45 atm., or for 1-hour treatments at temperatures greater than 1800° C., or for treatment times greater than 1 hour at 1800° C., fiber tensile strength began to degrade below that of the original SYLRAMIC fiber. Thus for batch processing of SYLRAMIC fiber preforms, the most convenient treatment conditions for boron removal with minimum fiber strength loss was determined to be one hour at 1800° C. at gas pressures from 1 to 40 atmospheres.

The chemical effects of these treatment conditions on the surface layers of the SYLRAMIC fiber can be seen in the depth-profile AES compositional results of FIG. 2. These results include data for (a) the as-produced SYLRAMIC fiber; (b) and (e), the SYLRAMIC-iBN fibers treated in nitrogen at 1 and 40 atm. pressure, respectively; and (c) and (d), the SYLRAMIC-iC fibers treated in argon at 1 and 40 atm. pressure, respectively. FIG. 2 clearly shows that the nitrogen treatments formed in-situ grown BN surface layers and that the argon treatments formed in-situ grown carbon-rich surface layers; thus the suffixes of iBN and iC for the fiber names. Furthermore, excess boron was depleted from the bulk of the SYLRAMIC fiber after all treatments, even during argon treatment, where presumably most of boron coming to the fiber surface was lost by vaporization or reaction with carbon. On the other hand, during nitrogen treatment, most of the boron was captured to form a silicon-free BN coating. However, due to limited availability of boron in the as-produced SYLRAMIC fiber, FIG. 2 shows that the maximum thickness of the in-situ BN layer was also limited (~150 nm) and was effectively independent of nitrogen gas pressure.

Losses in single fiber strength after treatment appeared to be caused primarily by a slight decrease in fiber diameter, which in turn was related to evaporation of silicon from the SiC fiber surface. Thus degradation in fiber load-carrying ability could be correlated to the reactivity and pressure of the treatment gas. This can be seen in FIG. 3, which compares typical average strength data for single fibers and tows of the as-produced SYLRAMIC fibers and the SYLRAMIC-iBN and SYLRAMIC-iC fibers produced at 40 atm. in nitrogen and argon, respectively. Here, the greater strength loss for the SYLRAMIC-iC fiber in single and tow form relative to that of the SYLRAMIC-iBN fiber can be attributed to the absence of a BN layer which aids to inhibit silicon evaporation. In addition, the SYLRAMIC-iC fibers and tows produced under 1 atm. of argon were weaker than those produced under 40 atm. due to more silicon evaporation and to thicker in-situ C layers (compare FIGS. 2c and 2d). Thus the SYLRAMIC-iC fibers were generally weaker than the SYLRAMIC-iBN fibers produced under the same time-temperature conditions. However, on the practical side, it should be noted that in contrast to the in-situ BN layers on the SYLRAMIC-iBN fibers, simple variation of the time-temperature-pressure conditions of the argon treatment could be used to control the thickness of the in-situ carbon layers on the SYLRAMIC-iC fibers.

Figure 4C:
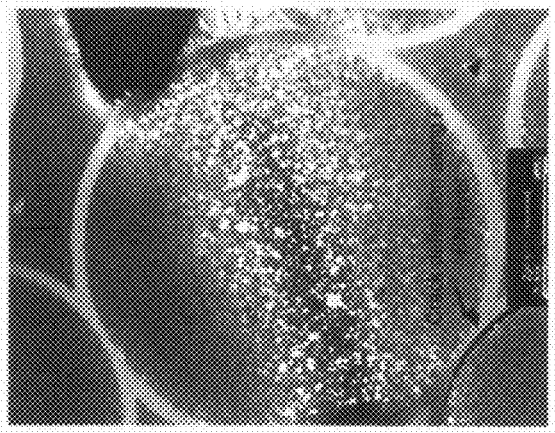
FIG. 4 provides TEM micrographs that show that treatment in high-purity nitrogen gas results in a technically useful BN layer microstructure (a, b), which can deflect matrix cracks in SiC/SiC composites (c).
Figure 4B:
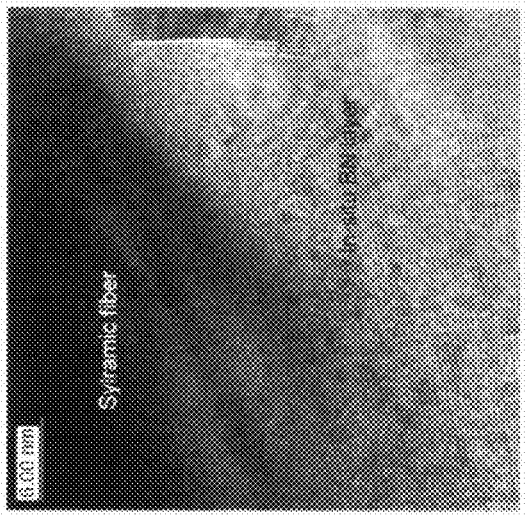
Figure 4A:

As a benefit for composite application, it was also determined that the AES results in FIG. 2 were independent of fiber position in the wound tows on the graphite cylinder or within the stacked fabric pieces covered by the dense graphite plates. In addition, it was found that the electrical resistance of single nitrogen-treated SYLRAMIC tows decreased significantly, dropping from >20000 ohm/cm to <500 ohm/cm. Although not measured, fiber thermal conductivity must have also improved, since the grains were slightly larger and the grain boundaries cleaner in the treated fibers. Also, the Transmission Electron Microscopy (TEM) photos in FIG. 4 show that the in-situ grown BN layers displayed microstructures (FIG. 4(a) and (b)) that were technically useful for low abrasion between contacting SiC fibers and for crack deflection in SiC/SiC composites (see FIG. 4(c)). Work by Thomas et al. (J. Am. Chem. Soc., 84 (1963), 4619-4622) suggests that such desirable BN microstructures are the result of low impurity content in the nitrogen gas; whereas if the nitrogen contained reactive impurities like oxygen, the BN could have grown with microstructures not conducive to low abrasion and good crack deflection.

Typically during the composite fabrication step of interphase deposition and also during composite service, there exists the risk that oxygen can reach the SiC fibers within tows and cause a composite strength loss due to oxide bonding of contacting fibers. To demonstrate that the in-situ BN surface layers produced by this invention have the potential for minimizing this risk, FIG. 3 provides data concerning the average tensile strength of single SYLRAMIC, SYLRAMIC-iC, and SYLRAMIC-iBN fiber tows measured at room temperature after exposure to air for 10 hours at 800° C. To simulate the tight fiber-fiber contact that typically occurs in textile-formed architectures, the tows were taken from 2D-woven fabric that was subject to the air exposure conditions. The oxygen in the air was expected to burn off any polymer-based sizing on the as-produced SYLRAMIC tows and perhaps the in-situ C layers on the SYLRAMIC-iC tows, thereby allowing the remaining surface layers of the SiC fibers to oxidize and bond together wherever fiber-fiber contact existed. This in turn should have significantly degraded the tensile strengths of these tows in comparison to the SYLRAMIC-iBN tows. FIG. 3 shows that these expectations indeed occurred, indicating the ability of the in-situ BN layer to resist oxidation and to offer oxidation-resistant physical barriers between contacting SiC fiber surfaces. The relatively good strength stability of the SYLRAMIC-iC fiber tows was unexpected, suggesting that the initial fiber-fiber separation provided by the in-situ C layers did not change during the fabric exposure, or that after in-situ carbon burn-off, the remaining surface was boron free and thus more-resistant to oxidation at 800° C.

Because one atmosphere is a convenient pressure that allows all SYLRAMIC fiber surfaces to be uniformly coated (even in the thick architectures) with either an in-situ BN or carbon layer and with little strength degradation, a first embodiment of this invention is batch processing using thermal treatment at one atmosphere pressure for the maximum time-temperature conditions of one hour and 1800° C. The choice of high-purity argon or nitrogen gas is dependent on the final composite application; that is, the choice between a high-performance fiber with an in-situ grown carbon layer of controllable thickness or a high-performance fiber with a thin in-situ grown BN layer with much better oxidative durability. For one-atmospheric treatment in the IVI furnace, the most practical treatment procedure was determined to be as follows: constant gas flow rate of 1 cubic-foot/hr during heat-up, temperature-hold, and during cool-down; furnace heat-up rates of ~20° C./min from 25 to ~1200° C., ~12° C./min from 1200 to 1500° C., ~7° C./min from 1500 to 1800° C.; furnace hold for 1 hour at 1800° C.; and furnace cool-down rates of ~10° C./min. from 1800 down to ~600° C., with over-night furnace cooling from ~600 to 25° C.

Figure 5:
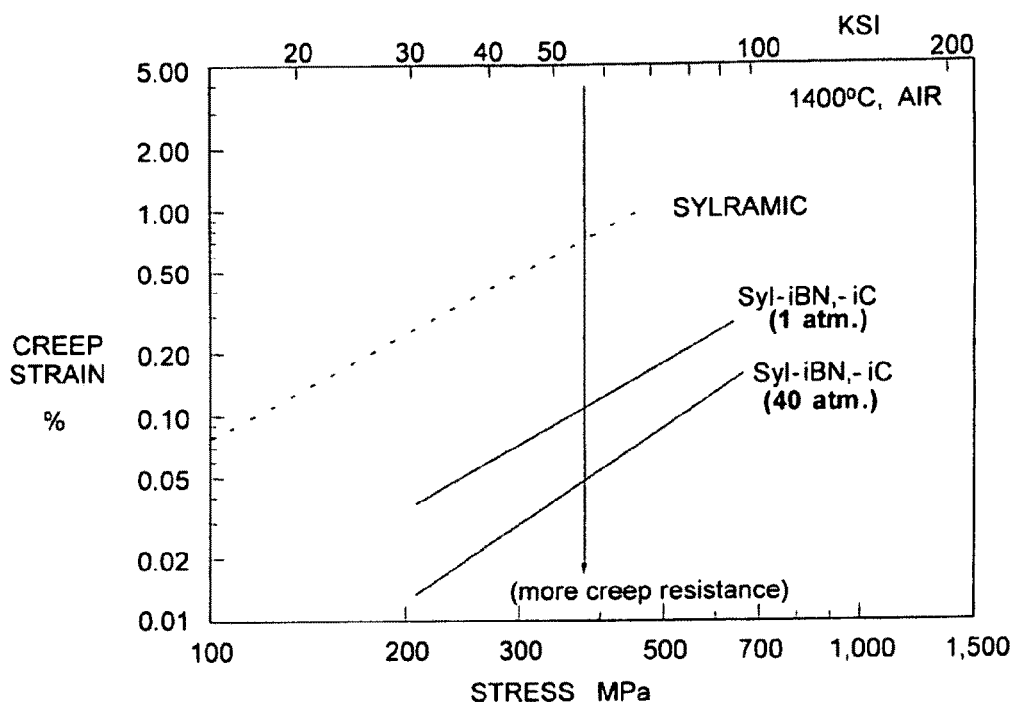
FIG. 5 compares the stress-dependence of creep strain measured after 10 hours in air at 1400° C. for single as-produced SYLRAMIC fibers and single SYLRAMIC-iBN and SYLRAMIC-iC fibers treated at one and 40 atmospheres.
Figure 6A:
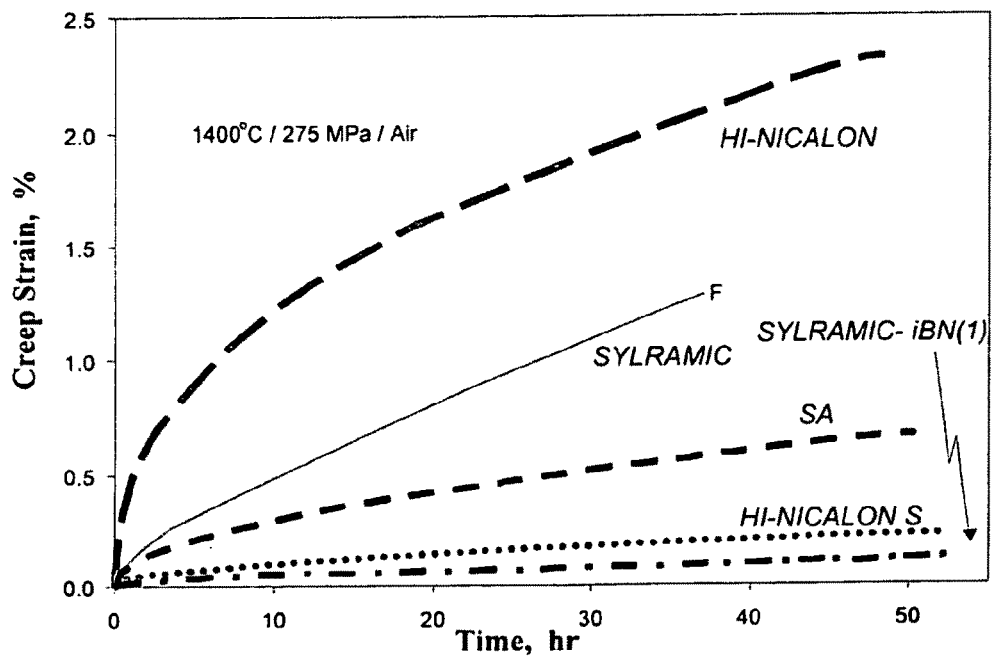
FIG. 6 shows the average (a) creep behavior and (b) stress-rupture behavior measured at an applied stress of 275 MPa in air at 1400° C. for single SYLRAMIC fibers and high-pressure formed SYLRAMIC-iBN fibers. For comparison purposes, creep-rupture data for as-produced single HI-NICALON Type S and TYRANNO SA SiC fibers are also shown.
Figure 6B:
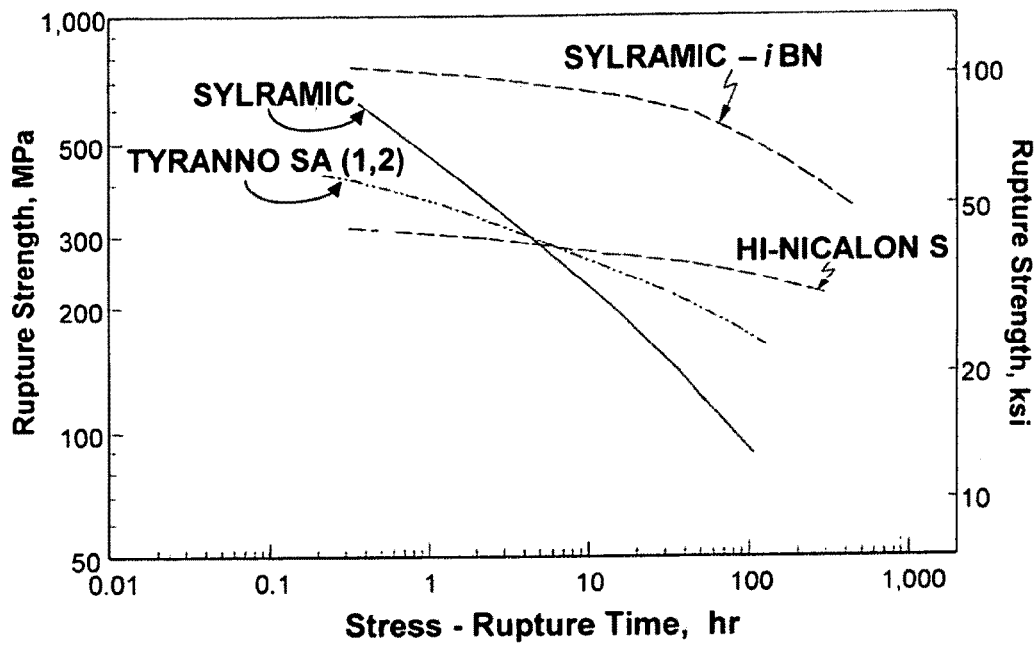

Regarding the second objective to determine the treatment conditions that optimize fiber tensile creep and rupture resistance, long-term creep-rupture measurements were made at constant stress at 1400° C. in air on single SYLRAMIC fibers before and after treatment in nitrogen and argon at one and 40 atmospheres. FIG. 5 compares the stress-dependence of the tensile creep strain measured after 10 hours for these five fiber types; whereas FIGS. 6(a) and 6(b) compare the average creep and rupture results, respectively, for SYLRAMIC-iBN fibers produced under 40 atm. and for as-produced SYLRAMIC, HI-NICALON Type S, and TYRANNO SA fibers. From FIG. 5, it is clear that boron removal is indeed beneficial for improving fiber creep resistance and that this benefit is the greatest for treatment pressures of 40 atmospheres. The basic mechanism for better creep resistance after high-pressure treatment is currently unknown, but may be related to more thorough boron removal or to enhanced nitrogen doping of the fiber grain boundaries. From FIG. 6, it is clear that in comparison to competing SiC fiber types, the high-pressure SYLRAMIC-iBN and SYLRAMIC-iC fibers display state-of-the-art behavior in terms of tensile creep and rupture resistance at high temperatures in air.

Thus a second embodiment of this invention, as determined with the high-pressure mini-HIP facility, is batch treatment of SYLRAMIC fiber architectures at a static gas pressure of 40 atmospheres using the same time-temperature schedule as described above for the IVI furnace. Besides achieving state-of-the-art tensile creep and rupture resistance for the individual fibers, the treatments under high gas pressure should also allow better penetration of the gases into the fiber architectures and aid in limiting silicon vaporization from the fiber surfaces. FIG. 1 lists some key properties of the high-pressure produced SYLRAMIC-iBN and SYLRAMIC-iC fibers (shaded area). It can be seen that in their as-produced condition these fiber types display the best combination of key properties needed for advanced SiC/SiC components; that is, high thermal conductivity, high tensile strength, and high creep resistance, which in turn allows the highest temperature capability (1300° C.) in terms of avoiding fracture or rupture for a given applied stress (500 MPa) and service life (1000 hours). Again, the choice of argon or nitrogen gas is dependent, respectively, on the choice of fiber surface with an in-situ BN layer for improved oxidative stability or with an in-situ carbon layer of controllable thickness.

Figures 7A, 7B:
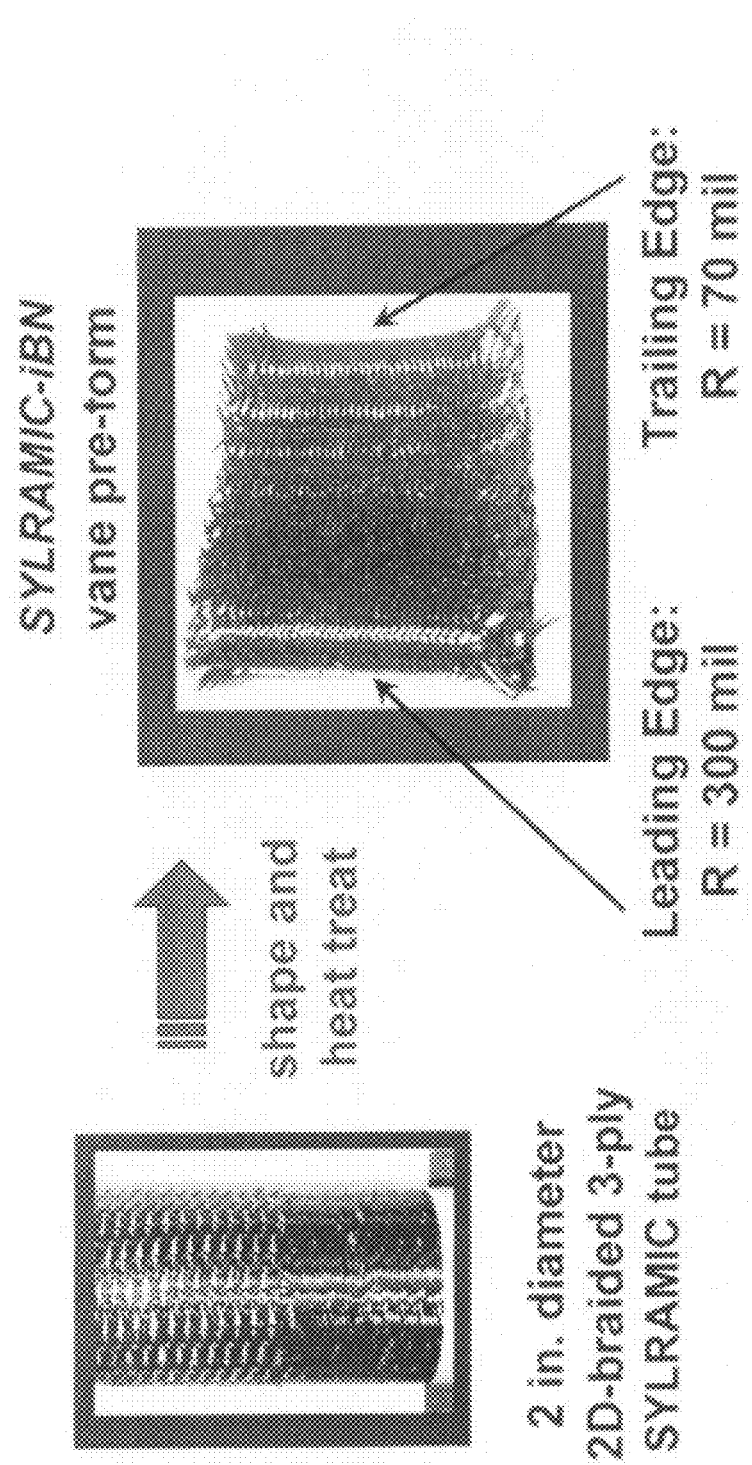
In FIG. 7(a), a vane-shaped graphite mandrel was placed inside of a 50-mm diameter 2D-braided SYLRAMIC fiber tubular architecture and then subjected to conditions that convert the fibers to SYLRAMIC-iBN.
In FIG. 7(b), the mandrel was removed, leaving a vane-shaped architecture with tight radii of curvature at the leading and trailing edges.

Regarding the third objective, although this invention has the advantage of stress relief in the SiC fabrics used for fabrication of simple 2D SiC/SiC panels, one of its benefits in this regard will also exist in the fabrication of the complex 3D fiber architectural preforms that will be needed for such engine components as vanes and blades. To illustrate this advantage, a vane-shaped graphite mandrel was placed inside a 50-mm diameter tubular-shaped 2D-braided SYLRAMIC fiber architecture (FIG. 7(a)), which was then subjected to the high temperature nitrogen conditions that convert the fibers to SYLRAMIC-iBN. The net result was not only complete fiber conversion to SYLRAMIC-iBN, but as shown in FIG. 7(b), the tubular architectural preform was permanently formed into a vane shape after mandrel removal. Thus for complex architectural preforms, this invention can be used to simultaneously improve SYLRAMIC SiC fibers and creep-form the preforms into component shapes with no residual elastic stresses remaining in the architectures. FIG. 7(b) shows that tight radii of curvature were formed at the vane leading and trailing edges, which would otherwise contain high residual stresses if the treatment was not employed. Again, the choice of nitrogen or argon gas is dependent, respectively, on the choice of a BN or carbon layer on the treated fiber surfaces for the final composite application.

Improved Ceramic Matrix Composite Structures

Given optimization of the treatment conditions for a variety of SYLRAMIC fiber architectural preforms, ceramic matrix composite panels with treated fabric stacks were fabricated at commercial composite vendors in order to determine whether the improved fiber properties could be retained after composite fabrication and whether the enhanced fiber surface conditions could offer any additional advantages. For the composite studies, the first embodiment of treatment in nitrogen at one atmosphere was primarily employed because the in-situ BN layer should offer improved environmental durability to the composite and because of the practical convenience of one-atmosphere treatment. For panel fabrication, eight 150×230 mm pieces were cut from a 5-harness satin fabric of commercial SYLRAMIC fiber that was woven with 20 tow ends per inch in the 0° (warp) and 90° (fill) directions. The fabric pieces or plies were stacked in a balanced manner and placed between two solid graphite plates, which were then placed in the IVI Hot Press and subjected to the optimized one-atmospheric treatment in order to form an 8-ply stack of SYLRAMIC-iBN fabric. The stacked plies were then provided to ceramic composite vendors such as GE Power Systems Composites, Goodrich, Synterials, and COI Ceramics in order to use conventional commercial processes to fabricate ceramic composite flat panels with approximate dimensions of 2×150×230 mm and with equal fiber content aligned along 150 and 230 mm directions.

At the composite vendors, two different types of thin (~0.5 μm) BN-based fiber coatings, A and B, were chemically vapor infiltrated onto the fiber surfaces. Coating A consisting of BN with small amounts of silicon doping was infiltrated into each 8-ply fabric stack; whereas coating B consisting of pure BN with a thin (~0.1 μm) CVI silicon nitride over-coating was deposited on large pieces of nitrogen-treated SYLRAMIC fabric prior to fabric cutting and stacking. Silicon doping and the silicon-nitride over-coating provided moisture resistance to the BN fiber coatings and thus allowed some degree of shelf life to the coated fabrics and preform stacks prior to matrix formation.

Ceramic matrices were then formed within the fabric stacks by five approaches: A, B, C, D, and E. For matrix A, a slightly silicon-rich SiC-based matrix was chemically vapor-infiltrated (CVI) into the BN-coated preform until the remaining composite porosity was reduced to ~10%. This CVI SiC matrix functioned as a strong, creep-resistant, and thermally conductive composite constituent, but was slightly silicon rich. For long times at temperatures above 1300° C., this silicon has been observed to diffuse out of the matrix toward the BN coatings and fibers, where it causes chemical attack and degrades composite strength. For matrix B, a SiC-based matrix was also chemically vapor-infiltrated into the BN-coated preform, but at reduced amount so that the remaining composite porosity was ~30 vol. %. This CVI SiC matrix B provided much of the advantages of matrix A, but contained a much lower content of free silicon due to its lower volume fraction. For matrix C, the open porosity remaining in the CVI SiC matrix B was filled by slurry infiltration of SiC particulate followed by non-reactive melt infiltration (MI) of molten silicon near 1400° C. The primary advantage of matrix C was that it decreased composite porosity to ~5 vol. %, thereby significantly increasing the matrix contribution to composite thermal conductivity, a key property needed for high-temperature components. However, the large silicon content in matrix C also limited the maximum temperature capability of the SiC/SiC composites to ~1300° C. For matrix D, the open porosity remaining in the CVI SiC matrix B was filled by a SiC-yielding polymer that was then pyrolyzed at temperatures up to 1600° C. This polymer infiltration and pyrolysis (PIP) process was repeated a few times until composite porosity was reduced to ~10 vol. %. The primary advantage of matrix D was that it decreased composite porosity without the addition of free silicon, thereby increasing the temperature capability of the SiC/SiC composite at the expense of a small decrease in composite thermal conductivity. Finally for matrix E, CVI SiC processes were eliminated and open porosities in preforms with fiber coating B were then filled by PIP plus ceramic particulate, or by PIP alone using either silicon nitride or SiC yielding polymers, leaving a final composite porosity of ~10%. The primary advantages of matrix E over matrix D was that it provided complete silicon-free ceramic matrices and accomplished this at reduced matrix processing times.

For standard measurements of stress-strain and creep-rupture behavior, dog-boned shaped tensile specimens (~10×150 mm) were machined from the ceramic composite panels with total fiber volume fractions ranging from ~24 to 40%. Each test specimen had half of the total fiber fraction aligned along the 150 mm or test direction. To demonstrate composite property improvement, the exact same fabrication procedures (coating and matrix) and testing procedures were performed on composite specimens reinforced by un-treated SYLRAMIC fibers and in some cases by as-produced HI-NICALON and HI-NICALON Type-S fibers.

Figure 8:
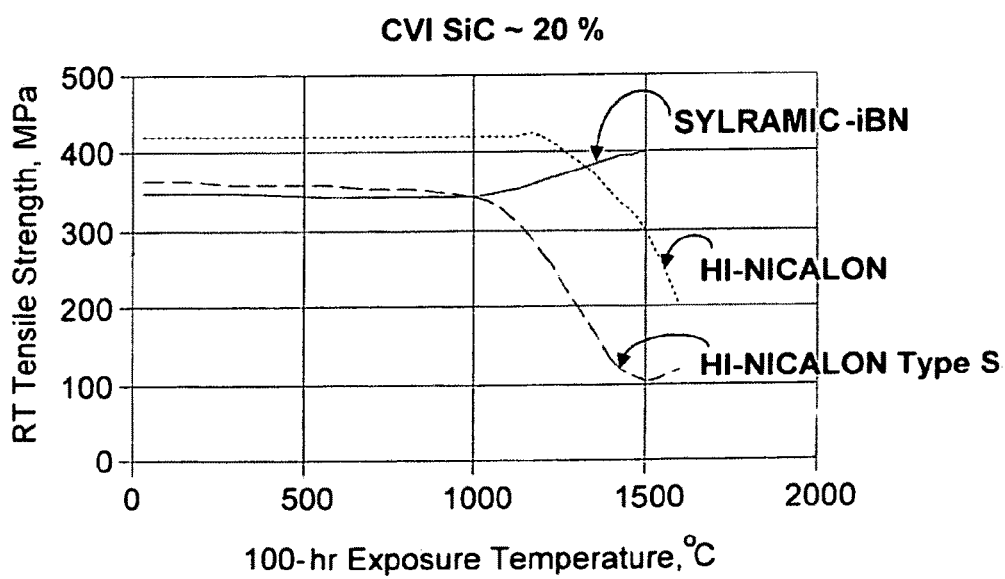
FIG. 8 shows the average ultimate tensile strength (UTS) retained at room temperature for various SiC/BN/SiC composites with BN coating A and CVI SiC matrix B after 100-hr thermal exposure in argon to 1700° C.

For demonstration of the upper time-temperature capability of the SYLRAMIC-iBN fiber in a composite environment, SiC/BN/SiC test specimens with matrix B and various fiber types were exposed for 100 hours in one atmosphere argon at temperatures up to 1700° C. Matrix B was selected for this study in order to minimize the effects of free silicon diffusion and attack of the fibers. As can be seen in FIG. 8, the composites reinforced by the SYLRAMIC-iBN fiber showed no loss in strength up to 1700° C.; whereas the composites reinforced by the HI-NICALON and HI-NICALON Type-S fibers showed a significant loss in strength at temperatures beginning as low as 1300° C. Part of this strength loss could be attributed to the lower production temperatures of these two fiber types (see FIG. 1), but a part may be due to fiber attack from the small amount of free silicon in CVI matrix B or from excess oxygen in the CVI BN fiber coating. On the other hand, it is well known that BN produced at high temperatures is resistant to molten silicon and oxygen. Thus the FIG. 8 results, which are to be expected given the high production temperature and in-situ grown BN layer on the SYLRAMIC-iBN fiber, show that this invention can produce SiC fibers and ceramic composite structures with state-of-the-art performance in terms of intrinsic temperature capability and strength retention. This is a key finding because it not only projects that the treated SYLRAMIC fibers can provide ceramic composites with higher temperature capability, but that advanced matrix processes can be carried out at temperatures well above 1400° C. without causing a strength loss in the fiber reinforcement.

Figure 9A:
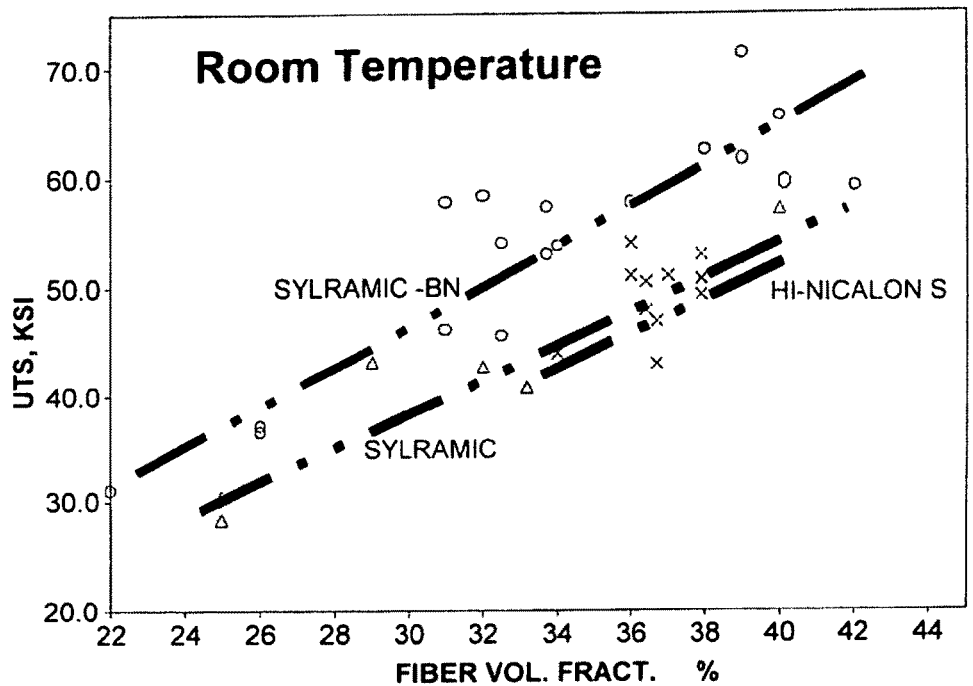
FIG. 9 shows the average ultimate tensile strength (UTS) for SiC/BN/SiC composites with coating A, (CVI+MI) matrix C, and balanced 0/90 fabric of various fiber types as measured at different total fiber volume fractions at (a) room temperature and (b) 1315° C. (2400° F.).
Figure 9B:
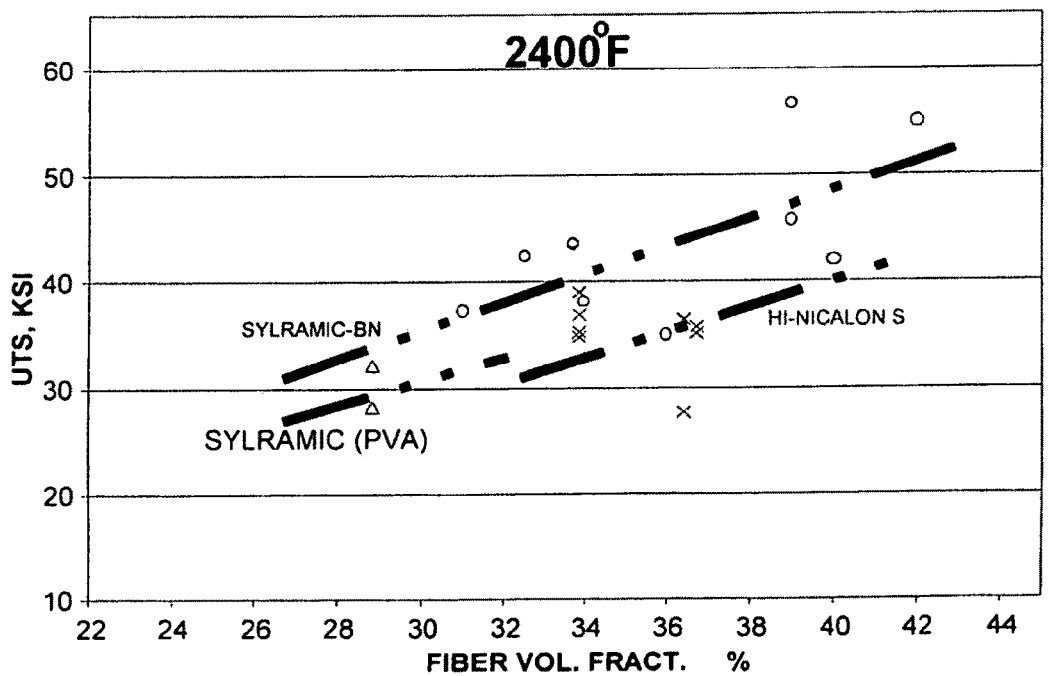

For demonstration that the SYLRAMIC-iBN fiber can also provide composites with high initial strength, FIG. 9 shows the ultimate tensile strength (UTS) measured (a) at room temperature and (b) at 1315° C. for as-fabricated SiC/BN/SiC composites with fiber coating A, matrix C, and reinforced by different total volume fractions of SYLRAMIC, SYLRAMIC-iBN, and HI-NICALON Type-S fibers. Clearly at both temperatures, ultimate strengths were higher for the SYLRAMIC-iBN composites than for the other composites fabricated and tested in the same manner. In addition, ultimate tensile strengths for as-fabricated SYLRAMIC-iBN composites with fiber coatings A and B, and matrices A, B, D, and E were observed to be equivalent to those with coating A and matrix C.

Since the nitrogen treatment did not enhance SYLRAMIC fiber strength (see FIG. 3), at least two other mechanisms may be responsible for the improved tensile strength of the various composite panels: (1) the in-situ BN treatment may have relieved detrimental elastic stresses in the woven fabric where 0° tows were interlaced with crossing 90° tows; and/or (2) boron removal and formation of the in-situ BN layer may have reduced the risk of SYLRAMIC fiber-fiber bonding in the presence of inadvertent oxygen introduced during deposition of the CVI BN fiber coatings A and B. The Scanning Electron Microscopy (SEM) photos in FIG. 10(a) show that this latter mechanism is indeed a key concern since textile forming of tows typically forces direct contact between neighboring SiC fibers. However, as shown in FIG. 10(b), this issue is less likely with the SYLRAMIC-iBN fibers, where direct contact between SiC fiber surfaces cannot be observed due to the thin in-situ BN layers that completely surround each fiber. Thus besides providing SiC fibers with improved performance, another key element of this invention is the formation of an in-situ grown BN-based fiber coating, which plays a strong role in allowing the improved fiber properties to be retained in a variety of high temperature ceramic composite structures. As demonstrated here and in the following, if this in-situ BN layer is not chemically attacked during formation of the compliant fiber coating or the high-temperature matrix, the composite systems will display enhanced behavior not only for as-fabricated ultimate strength, but also for all key fiber-controlled high-temperature composite properties.

Figure 11A:
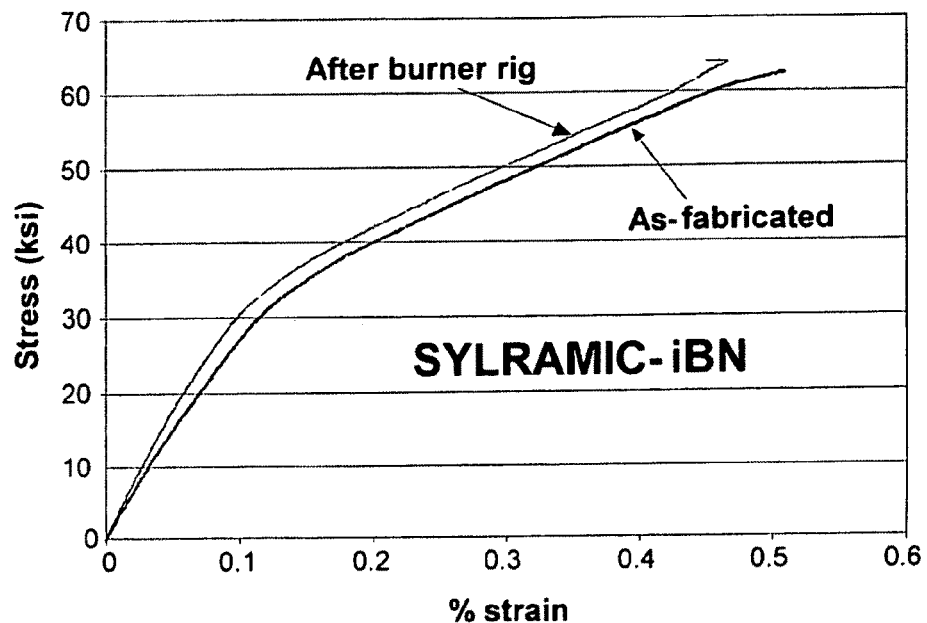
FIG. 11 shows the room-temperature tensile stress-strain behavior for SiC/BN/SiC composites with coating A, (CVI+MI) matrix C, and 0/90 fabric of (a) SYLRAMIC-iBN and (b) HI-NICALON Type S fiber types. These curves were measured before and after combustion gas exposure in a low-pressure burner rig at 800° C. for ~100 hours.
Figure 11B:
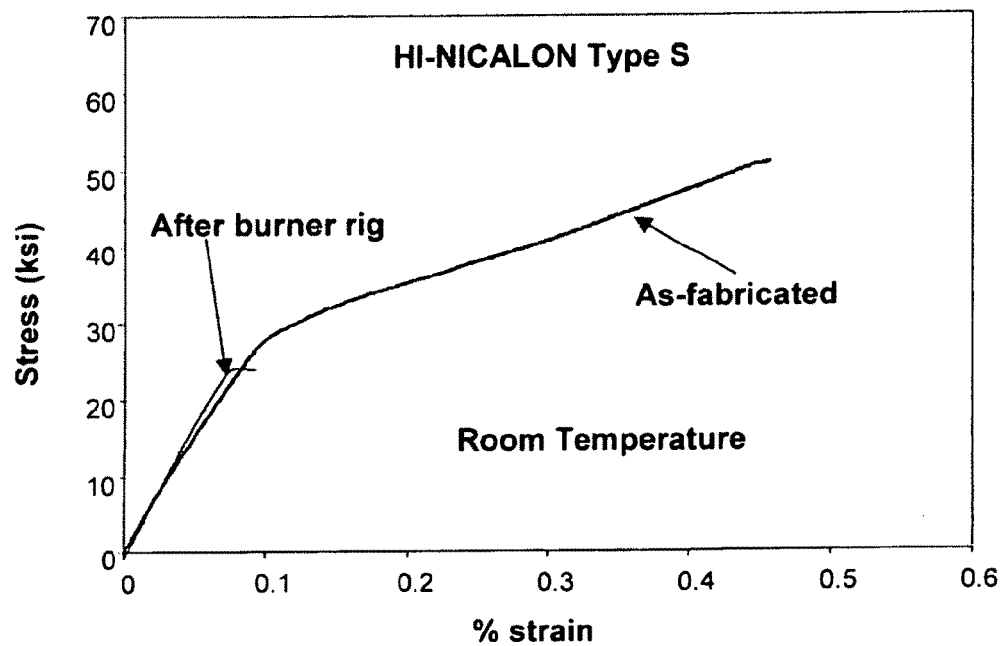

Besides high strength, another desirable ceramic composite property requirement, especially for engine components, is the ability to resist oxygen attack either along the length of fibers that intersect the composite surface or through matrix cracks that may randomly develop during composite service. This is a key problem, particularly at intermediate temperatures (600 to 1000° C.) where protective silica ($SiO_2$) layers on the SiC composite surface are slow to form and thereby minimize oxygen ingress. FIG. 11 shows the room-temperature tensile stress-strain behavior of the SiC/BN/SiC specimens with fiber coating A and matrix C, as measured before and after combustion gas exposure in a low-pressure burner rig at 800° C. for ~100 hours. These composites with total fiber content of ~36 vol. % had machined edges with no protective surface coatings so that the aggressive burner rig combustion gases (oxygen and moisture) could penetrate along the length of fibers that intersect the composite surface. Even with a CVI BN coating, the carbon-rich surfaces of the HI-NICALON Type-S fibers were easily removed during burner-rig exposure, allowing contacting fibers in the composite tows to bond together and fracture at a significantly lower stress than the as-fabricated composite. On the other hand, the in-situ BN layers on SYLRAMIC-iBN fibers provided excellent resistance to this exposure, allowing damage tolerance of the composites to be retained for at least 100 hours.

Figure 12:
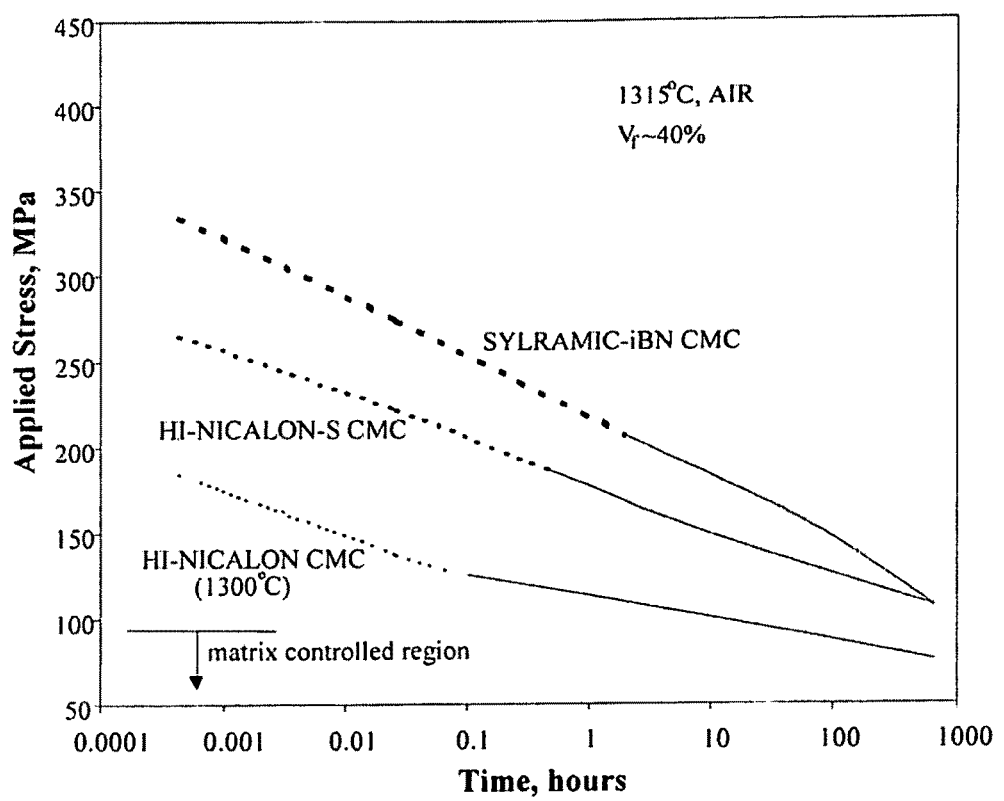
FIG. 12 shows the average stress-rupture behavior for SiC/BN/SiC composites as tested under constant stress conditions in air at 1315° C. These composites with coating A, (CVI+MI) matrix C, and total fiber content of ~40% were tested at stresses above matrix cracking, so that composite rupture life was controlled by the particular SiC fiber type bridging the matrix cracks and thus exposed to the air environment.

Another ceramic composite test that showed both the better oxidative durability and better creep-rupture resistance offered by the SYLRAMIC-iBN fiber is the high-temperature stress rupture test performed in air on composites with SiC matrices that were initially cracked during application of the test load. In this case, the total composite mechanical load was on the crack-bridging fibers, which were not only susceptible to oxygen-induced attack down the open matrix cracks, but also to creep induced damage. FIG. 12 shows the average rupture life behavior at constant stress in air at 1315° C. for various SiC/BN/SiC test specimens with fiber coating A, matrix C, and ~40 vol. % total fiber content (~20% in stress direction). Clearly, the SYLRAMIC-iBN fiber provided SiC/SiC composites with the best rupture resistance in terms of retaining structural capability for the longest time for a given applied tensile stress on the composite.

As described above, this invention will also allow the use of argon treatments for the formation in-situ carbon layers of controllable thickness and for the creep forming of architectural preforms for any high-temperature SiC fiber. Nevertheless, specific embodiments focus (1) on near-stoichiometric boron-containing SiC fibers in general and commercial high-strength SYLRAMIC fibers in particular, and (2) on nitrogen treatments at one and 40 atmospheres. Both nitrogen-pressure treatments produce creep and rupture resistant high-strength SiC fibers with crack deflecting and oxidation-resistant in-situ BN layers on their surfaces and also allow stress-relaxation and creep forming of fiber architectural preforms. However; while the one-atmosphere treatment may be more practically convenient; the 40-atmosphere treatment maximizes fiber creep-rupture resistance and thus should further improve the thermo-structural capability of the high temperature composite structures over the capability demonstrated here. However, to achieve this capability, as discussed above, it would probably require ceramic matrices that have near-zero free silicon content.

Although ranges of applicability for this invention have been described and two preferred embodiments selected, it would be apparent to those skilled in the art that certain modifications, variations, and alternative constructions would be applicable, while remaining within the spirit and scope of the invention. For example, for greater fiber thoughput, the described thermal treatments were performed in a batch mode, both for continuous-length tow and for discrete volumes of fiber architectural preforms. For the tow treatment, it may be desirable to work in a continuous mode where the precursor boron-containing SiC fibers are passed through the treatment furnaces in a continuous manner using treatment times <1 hour at maximum temperatures >1800° C. However, gas pressures above one atmosphere may not be practical for this approach. Also, although not discussed in detail here, the in-situ BN coatings are typically insufficient in thickness (~150 nm) to serve as the primary interphase material for crack deflection, thus the need of an additional CVI BN interphase (~500 nm) for the SiC/BN/SiC composites described here. Obviously higher boron content in the precursor fiber could increase the in-situ BN thickness and thus eliminate the CVI BN step, a very desirable practical goal. However, removal of higher boron content may leave larger voids in the precursor fiber, which in turn could result in an undesirable fiber strength loss after treatment. Alternatively, one might keep the low boron content of the SYLRAMIC fiber and increase the fiber diameter so that more boron is available for a thicker coating. In addition, this invention performs the thermal-chemical treatments on open fiber architectures for good gas penetration. One might envision that if open porosity existed in the BN coating and ceramic matrix materials, the gas treatments could also be performed at other stages of composite fabrication. However, such processing would not be conducive to the important formation of in-situ carbon or BN layers between SiC fibers since the fibers would have already been placed in close contact during the architecture and coating formation stages.

In order to determine the metes and bounds of the invention, reference should be made to the appended claims.

The invention claimed is:
1. A method for treating ceramic fibers comprising:
providing textile-formed ceramic fibers having internal stresses therein;
providing a mandrel having a desired net shape;
creating a preform by applying reshaping stresses to the fibers onto the mandrel so that the preform takes the desired net shape of the mandrel;
placing the preform and mandrel into a processing furnace for thermal treatment at a processing temperature for a processing time and in a processing gas at a pressure at or between 0.1 MPa (1 atm) and 4.0 MPa (40 atm);
relaxing by fiber creep during thermal treatment the internal stresses created in the fibers by the textile forming and by the perform shaping;
maintaining during thermal treatment high fiber strength while simultaneously improving fiber creep resistance; and
creating, as a result of the thermal treatment, a stress-free preform with the near-net shape of the mandrel.
2. The method of claim 1, wherein the textile-formed fibers are at least one of a finite section of a continuous-length multi-fiber tow, a two-dimensional textile-formed fabric, or a three-dimensional textile-formed complex-shaped structure.
3. The method of claim 2, wherein the ceramic fibers comprise silicon carbide fibers or boron-containing silicon carbide fibers or both.
4. The method of claim 3, wherein the thermal treatment permits boron to be removed from the bulk of each fiber.

5. The method of claim 4, wherein the thermal treatment permits atomic decomposition of silicon from the surface of each fiber and the in-situ growth of a carbon-rich layer on the surface of each fiber.

6. The method of claim 5, wherein the processing gas is inert to silicon carbide.

7. The method of claim 6, wherein the processing gas is argon.

8. The method of claim 7, wherein the argon processing gas has a purity of approximately 99.999%.

9. The method of claim 8, wherein the processing temperature is approximately 1600° C. or greater and the processing time is approximately one to five hours.

10. The method of claim 9, wherein the ceramic fibers are produced above 1600° C. with a silicon-carbide composition.

11. The method of claim 2, wherein the ceramic fibers comprise boron-containing silicon carbide fibers.

12. The method of claim 11, wherein the processing gas is nitrogen.

13. The method of claim 12, wherein the nitrogen processing gas has a purity of approximately 99.999%.

14. The method of claim 13, wherein the thermal treatment allows boron to be removed from the bulk of each fiber.

15. The method of claim 14, wherein, during the thermal treatment, boron within the fiber diffuses to the fiber surface to react with the nitrogen atmosphere to form a boron-nitride based layer on the surface of each fiber.

16. The method of claim 15, wherein the ceramic fibers are produced above 1800° C. with a boron-containing silicon-carbide composition.

17. The method of claim 16, wherein the processing temperature is approximately 1800° C. and the processing time is approximately one hour.

18. The method of claim 1, wherein the desired net shape is a turbine vane.

19. The method of claim 1, wherein the desired net shape is a turbine blade.

* * * * *